(12) United States Patent
Watanabe et al.

(10) Patent No.: US 11,162,563 B2
(45) Date of Patent: *Nov. 2, 2021

(54) TENSIONER

(71) Applicant: TSUBAKIMOTO CHAIN CO., Osaka (JP)

(72) Inventors: Masanori Watanabe, Osaka (JP); Tomohiro Fuse, Osaka (JP); Yoshihiro Furubayashi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 319 days.

This patent is subject to a terminal disclaimer.

(21) Appl. No.: 16/244,448

(22) Filed: Jan. 10, 2019

(65) Prior Publication Data

US 2019/0257390 A1  Aug. 22, 2019

(30) Foreign Application Priority Data

Feb. 21, 2018 (JP) .............................. JP2018-028910

(51) Int. Cl.
*F16H 7/08* (2006.01)

(52) U.S. Cl.
CPC ... *F16H 7/0848* (2013.01); *F16H 2007/0806* (2013.01); *F16H 2007/0812* (2013.01);
(Continued)

(58) Field of Classification Search
CPC .. F16H 7/0848; F16H 7/08; F16H 2007/0859; F16H 2007/0814;
(Continued)

(56) References Cited

U.S. PATENT DOCUMENTS 6,383,103 B1 * 5/2002 Fujimoto ............... F01L 1/02
474/109
6,398,682 B1 6/2002 Suzuki et al.
(Continued)

FOREIGN PATENT DOCUMENTS

JP H07-41113 U 7/1995
JP 2001-12569 A 1/2001

OTHER PUBLICATIONS

Machine Translation of JPH 07-041113U. (Year: 1995).*

*Primary Examiner* — Michael R Mansen
*Assistant Examiner* — Juan J Campos, Jr.
(74) *Attorney, Agent, or Firm* — Westerman, Hattori, Daniels & Adrian, LLP

(57) ABSTRACT

To provide a tensioner capable of keeping oil pressure in an oil pressure chamber stable with a simple structure. The tensioner is equipped with a pressure adjusting mechanism that adjusts oil pressure in the oil pressure chamber and includes an adjustment space formed in a housing and communicating with the oil pressure chamber, a movable member disposed such as to be movable to and from the oil pressure chamber, and a pressure adjusting biasing unit that biases the movable member toward the oil pressure chamber. A liquid tight seal is maintained between the movable member and an inner wall of the adjustment space, between a position where the movable member has moved closest to the oil pressure chamber and a position where the movable member is farthest from the oil pressure chamber.

4 Claims, 4 Drawing Sheets

(52) U.S. Cl.
CPC ............... *F16H 2007/0814* (2013.01); *F16H 2007/0859* (2013.01)

(58) Field of Classification Search
CPC ..... F16H 2007/0806; F16H 2007/0812; F16H 2007/0842; F16H 2007/0887; F16H 2007/0891
See application file for complete search history.

(56) References Cited

U.S. PATENT DOCUMENTS

| | | | | |
|---|---|---|---|---|
| 6,609,987 B1* | 8/2003 | Beardmore | ............... | F01L 1/02 474/111 |
| 2012/0135831 A1* | 5/2012 | Perissinotto | .......... | F16H 7/0848 474/110 |
| 2012/0192821 A1* | 8/2012 | Herbert | .................. | F01L 1/022 123/90.31 |
| 2013/0178317 A1* | 7/2013 | Perissinotto | .......... | F16H 7/0836 474/110 |
| 2017/0356529 A1* | 12/2017 | Simmons | .............. | F16H 7/0848 |
| 2018/0274638 A1* | 9/2018 | Watanabe | ............. | F16H 7/0848 |

* cited by examiner

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension of a chain or the like. For example, a chain guide mechanism has been known, which slidably guides, by means of a tensioner lever, a drive chain such as an endless roller chain passing over respective sprockets of a crankshaft and a cam shaft inside an engine room, and which uses a tensioner to bias the tensioner lever in order to maintain appropriate tension of the chain or the like.

One known tensioner 510 used in such a chain guide mechanism includes, as shown in FIG. 5, a plunger 520 having a plunger hole 521 that is open on a rear side, a housing 530 having a plunger bore 531 that is open on a front side for accommodating the plunger 520, a relief valve mechanism that releases oil in an oil pressure chamber 511 to the outside of the plunger 520 when oil pressure in the oil pressure chamber 511 rises, and a main spring 540 accommodated in the oil pressure chamber 511 formed between the plunger 520 and the plunger bore 531 such as to freely expand and contract and to bias the plunger 520 toward the front side (see, for example, Japanese Patent Application Laid-open No. 2001-12569).

In this tensioner 510 described in Japanese Patent Application Laid-open No. 2001-12569, a pressure passage 524 in communication with the oil pressure chamber 511, a discharge hole 523 that connects the pressure passage 524 with the outside of the plunger 520, and a spring accommodating space 512 formed on the front side of the pressure passage 524, are formed at the bottom of the plunger 520. The relief valve mechanism is made up of a valve member 560 slidably fitted in the pressure passage 524, and a relief spring 552 set inside the spring accommodating space 512 to bias the valve member 560 toward the oil pressure chamber 511.

In this tensioner 510, when the oil pressure in the oil pressure chamber 511 rises, the valve member 560 moves forward against the biasing force of the relief spring 552 so that the pressure passage 524 communicates with the discharge hole 523 and the oil is released from the discharge hole 523.

SUMMARY OF THE INVENTION

One problem with such a tensioner 510 was that the oil pressure in the oil pressure chamber 511 sometimes varied largely due to fluctuations in the force the plunger 520 received from the chain, or the variation in the amount of oil supplied to the oil pressure chamber 511. The tensioner 510 described in Japanese Patent Application Laid-open No. 2001-12569 could assume only two positions, i.e., one where the valve member 560 blocks the pressure passage 524 to stop release of oil to the outside of the plunger 520, and the other where the valve member 560 is moved forward by the oil pressure of the oil pressure chamber 511 to allow the oil to be released from the discharge hole 523 to the outside of the plunger 520, because of which it was difficult to keep the oil pressure in the oil pressure chamber 511 stable.

With the relief valve mechanism of Japanese Patent Application Laid-open No. 2001-12569, when the oil pressure in the oil pressure chamber 511 rises, part of the oil supplied from a hydraulic power source such as an oil pump is released to the outside. This leads to an increased amount of oil consumption and necessitates higher power capacity of the hydraulic power source.

The present invention solves these problems and it is an object of the invention to provide a tensioner that can keep the oil pressure inside an oil pressure chamber stable with a simple structure.

The present invention solves the problems described above by providing a tensioner including a plunger having a plunger hole that is open on a rear side, a housing having a plunger bore that is open on a front side and accommodates the plunger, a main biasing unit that biases the plunger toward the front side, and a pressure adjusting mechanism that adjusts oil pressure in an oil pressure chamber formed between the plunger and the plunger bore. The pressure adjusting mechanism includes an adjustment space formed in the housing and communicating with the oil pressure chamber, a movable member disposed in the adjustment space such as to be movable to and from the oil pressure chamber, and a pressure adjusting biasing unit that biases the movable member toward the oil pressure chamber. The pressure adjusting mechanism is configured such that a liquid tight seal is maintained between the movable member and an inner wall of the adjustment space, between a position where the movable member has moved closest to the oil pressure chamber and a position where the movable member is farthest from the oil pressure chamber.

According to one aspect of the present invention, the tensioner includes a pressure adjusting mechanism, which includes an adjustment space formed in the housing and communicating with the oil pressure chamber, a movable member disposed in the adjustment space such as to be movable to and from the oil pressure chamber, and a pressure adjusting biasing unit that biases the movable member toward the oil pressure chamber, and which is configured such that a liquid tight seal is maintained between the movable member and an inner wall of the adjustment space, between a position where the movable member has moved closest to the oil pressure chamber and a position where the movable member is farthest from the oil pressure chamber.

When the oil pressure in the oil pressure chamber exceeds a certain level, the movable member moves away from the oil pressure chamber. As the volume of the oil pressure chamber increases in accordance with the moving amount of the movable member, the pressing force of the plunger applied to the chain can be gradually reduced. Thus, the oil pressure in the oil pressure chamber and the pressing force of the plunger can be made stable with a simple structure.

Since release of part of oil to the outside as in a conventional tensioner provided with a relief valve mechanism can be avoided, the amount of oil consumption can be reduced, which enables the hydraulic power source to have a smaller power capacity. Also, since gradual leakage of oil from the oil pressure chamber to the outside when the engine is stopped during which no oil is supplied to the tensioner can be avoided, the amount of oil in the oil pressure chamber can be maintained over a long period of time, and failures such as abnormal noise when the engine is restarted can be prevented.

Since the adjustment space in which the movable member is disposed is formed in the housing, there is less need to consider possible influences on the basic functions of the tensioner. The degree of freedom in design, such as dimensions of the adjustment space, movable member, and pressure adjusting biasing unit, can be increased, so that it is possible to improve the pressure adjustment functionality. The degree of freedom in designing the plunger structure and the main biasing unit can also be increased, since an oil reservoir chamber can be formed inside the plunger.

According to another aspect of the present invention, the piston part of the movable member is disposed slidably in the cylinder part formed in the housing. This way, the change in volume of the oil pressure chamber in accordance with the moving amount of the movable member can easily be made larger with a simple structure, and the liquid tight seal between the cylinder part and the piston part can readily be maintained in a precise manner.

According to another aspect of the present invention, the pressure adjusting mechanism includes a movement restricting part that restricts movement of the movable member toward the oil pressure chamber. The moving range of the movable member is thus limited so that the volume of the oil pressure chamber can be set accurately. The movement restricting part can also be utilized as a section that determines the position of the movable member during assembly, whereby the cost of assembly can be reduced.

According to another aspect of the present invention, the adjustment space is formed to open to the outside of the housing. The pressure adjusting mechanism includes an attachment member attached to the housing, and a pressure adjusting spring is set such that one end thereof abuts on the movable member while the other end abuts on the attachment member. It is thus possible to install the movable member and pressure adjusting spring into the adjustment space formed in the housing even after the plunger and others have been assembled to the housing, and therefore an increase in the assembling cost of the tensioner can be avoided.

DESCRIPTION OF THE PREFERRED EMBODIMENTS

A tensioner 10 according to one embodiment of the present invention will be described below with reference to the drawings.

Figure 1:
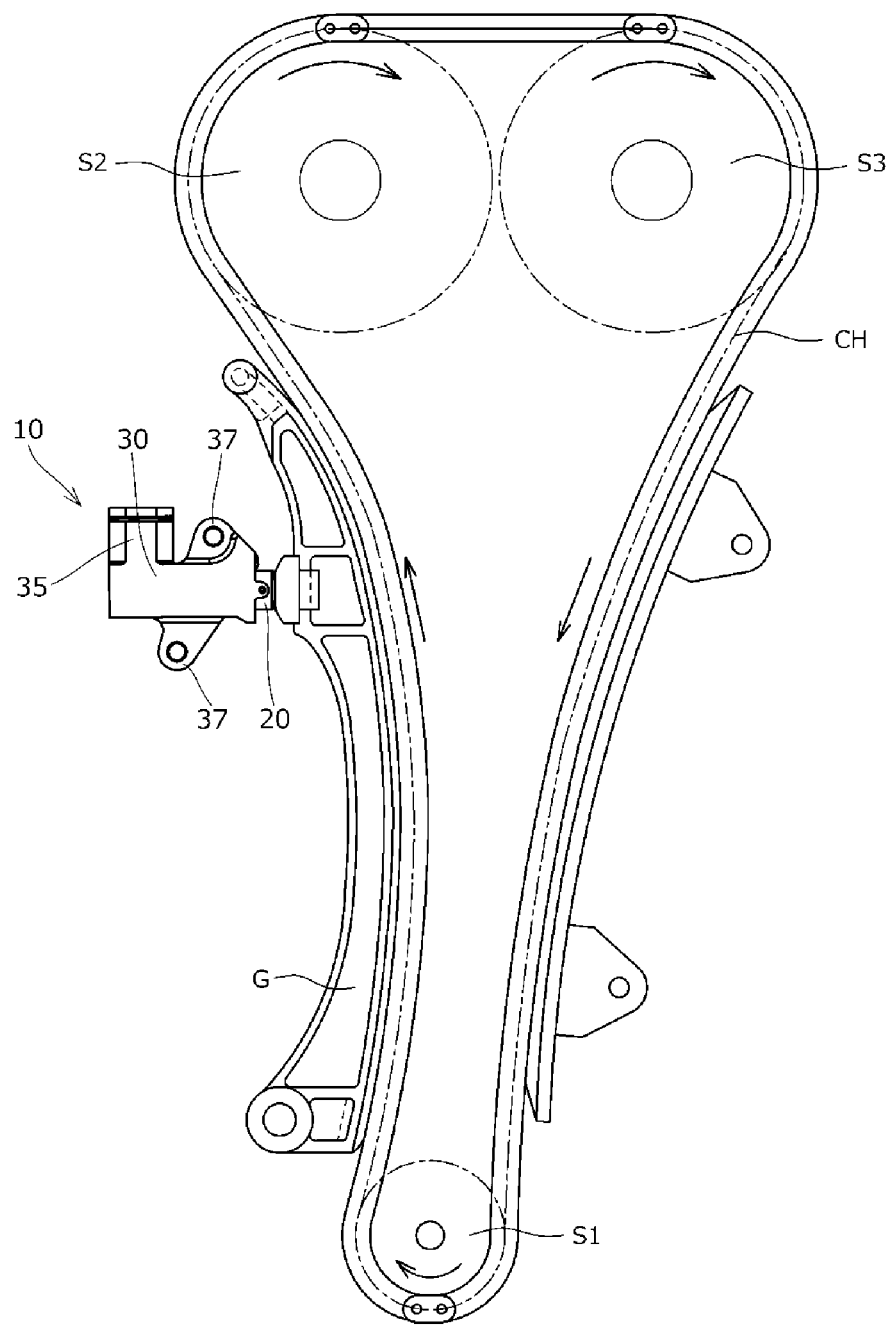
FIG. 1 is an illustrative diagram showing a timing system in which a tensioner according to one embodiment of the present invention is incorporated.

First, the tensioner 10 is incorporated in a chain transmission used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 4:
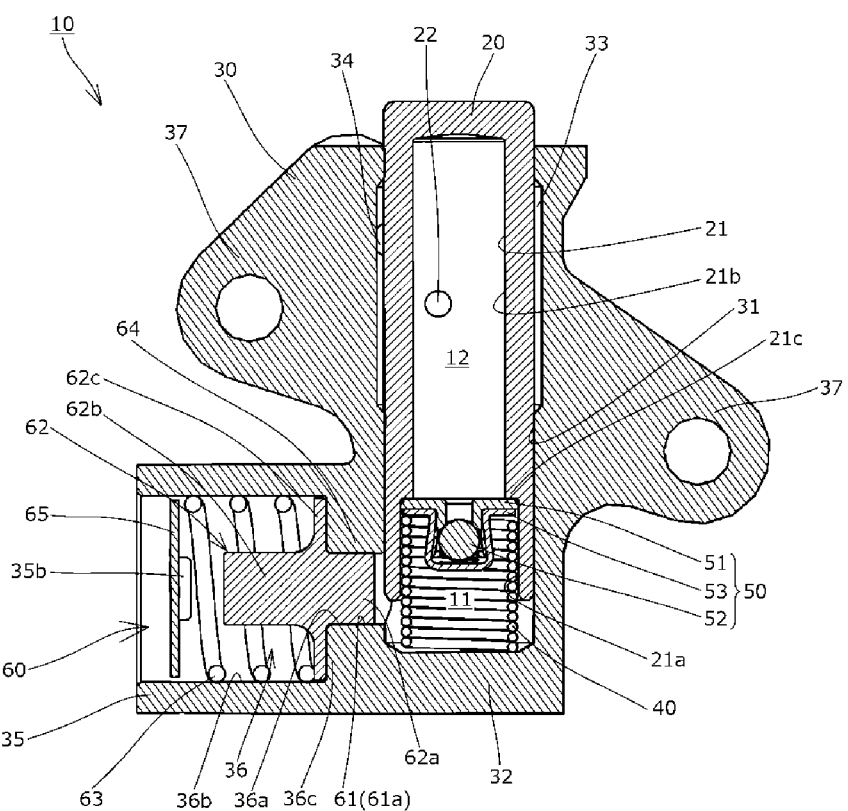
FIG. 4 is a cross-sectional view illustrating the tensioner.
Figure 5:
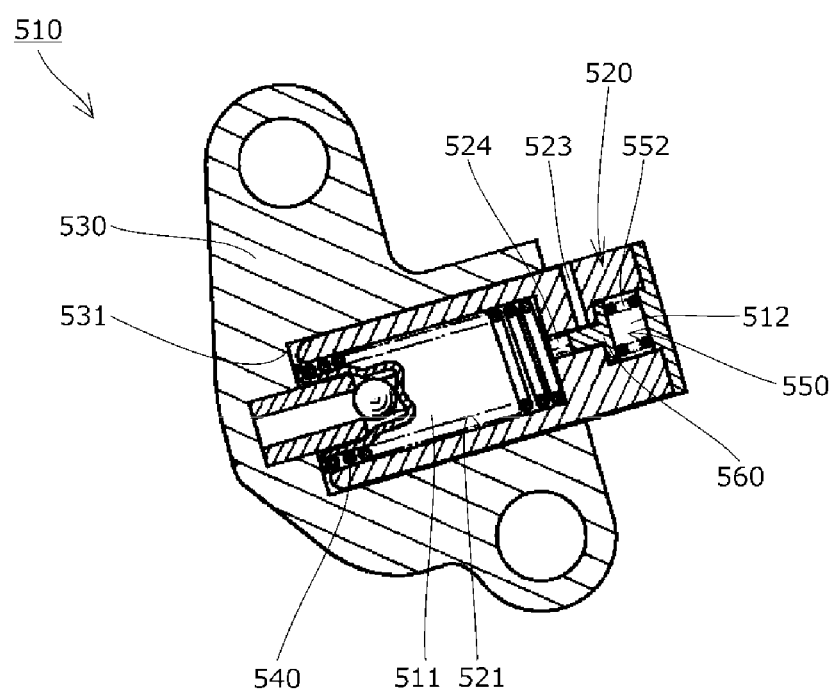
FIG. 5 is a cross-sectional view illustrating a tensioner of related art.

The tensioner 10 includes, as shown in FIG. 4, a plunger 20 having a cylindrical plunger hole 21 that is open on a rear side, a housing 30 having a plunger bore 31 that is open on a front side and accommodates the plunger 20, a main spring (main biasing unit) 40 accommodated inside an oil pressure chamber 11 that is formed between the plunger 20 and the plunger bore 31 such as to freely expand and contract and to bias the plunger 20 toward the front side, a check valve 50 that divides the space between the housing 30 and the plunger 20 into an oil reservoir chamber 12 on the front side and the oil pressure chamber 11 on the rear side, and allows oil to flow into the oil pressure chamber 11 and prevents reverse flow of the oil back into the oil reservoir chamber 12, an oil supply passage for supplying oil from the outside of the housing 30 into the oil reservoir chamber 12, and a pressure adjusting mechanism 60 that adjusts the oil pressure in the oil pressure chamber 11.

Hereinafter, various constituent elements of the tensioner 10 will be described with reference to the drawings.

First, the plunger 20 is made of metal such as iron or the like and inserted in the plunger bore 31 such as to be movable back and forth in the front to back direction, as shown in FIG. 4.

The plunger hole 21 includes a large-diameter hole 21a on the rear side, a small-diameter hole 21b on the front side continuously and coaxially formed on the front side of the large-diameter hole 21a, and a stepped portion 21c formed between these large-diameter hole 21a and small-diameter hole 21b as shown in FIG. 4.

The check valve 50 is set inside the large-diameter hole 21a of the plunger hole 21 as shown in FIG. 4. The stepped portion 21c of the plunger hole 21 serves as a portion restricting the movement of the check valve 50 toward the oil reservoir chamber 12 (front side).

The plunger 20 is formed with a plunger through hole 22, as shown in FIG. 4, which extends from an outer circumferential surface through to an inner circumferential surface of the small-diameter hole 21b (oil reservoir chamber 12) of the plunger 20.

Figure 2:
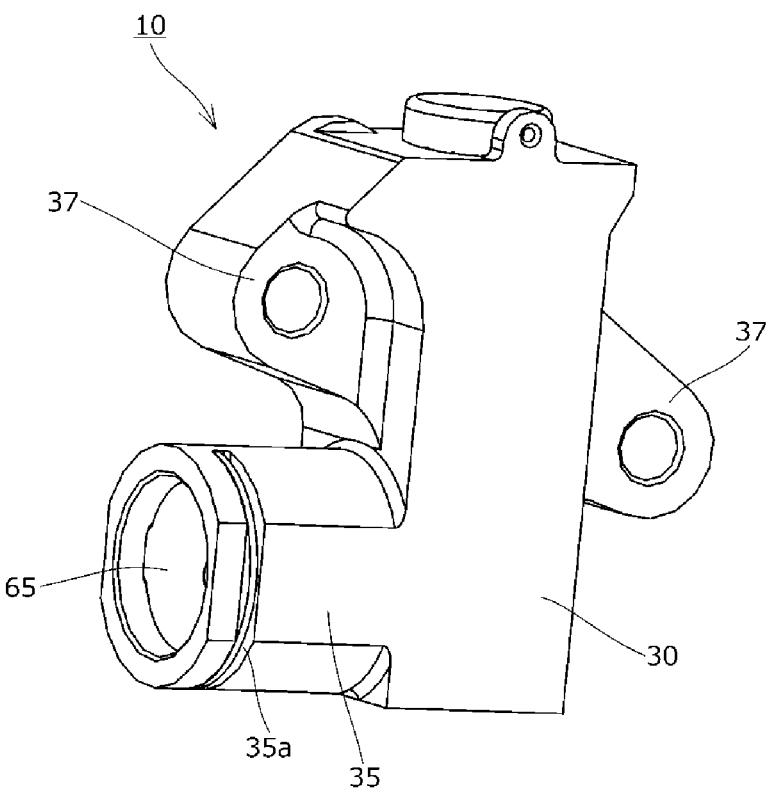
FIG. 2 is a perspective view illustrating the tensioner.

The housing 30 is made of metal such as iron or the like and includes, as shown in FIG. 2 or FIG. 4, the cylindrical plunger bore 31, a bottom part 32 formed on the rear side, a connection/adjustment groove 33 formed in an annular shape on the inner circumferential surface of the plunger bore 31, a housing oil supply hole 34 extending from the outside of the housing 30 through to the inner circumferential surface of the plunger bore 31 for supplying oil to the connection/adjustment groove 33, a protruded part 35 projecting sideways on the rear side of the housing 30 (plunger bore 31), an adjustment space 36 formed inside the housing 30 (mainly the protruded part 35) such as to communicate with the oil pressure chamber 11 (plunger bore 31), and a mounting part 37 for securing the housing 30 to the engine block.

The adjustment space 36 communicates with the oil pressure chamber 11 (plunger bore 31), as well as opens to the outside of the housing 30, as shown in FIG. 4.

The adjustment space 36 includes, as shown in FIG. 4, a cylindrical small-diameter hole 36a that communicates with the oil pressure chamber 11 (plunger bore 31), a cylindrical large-diameter hole 36b continuous and coaxial with the small-diameter hole 36a and open to the outside of the housing 30, and a stepped portion 36c formed between these small-diameter hole 36a and large-diameter hole 36b.

As shown in FIG. 2 or FIG. 4, the protruded part 35 is formed with an insertion slit 35a for allowing insertion of an attachment member 65 to be described later from the outside of the housing 30, and a locking slit 35b for a protruded portion of the attachment member 65 to fit in.

The oil supply passage for supplying oil from the outside of the housing 30 to the oil reservoir chamber 12 is made up of the plunger through hole 22, housing oil supply hole 34, and connection/adjustment groove 33, as shown in FIG. 4.

The connection/adjustment groove 33 may be formed at least in one of the outer circumferential surface of the plunger 20 and an inner circumferential surface of the plunger bore 31.

The housing oil supply hole 34 is connected to an oil pump (not shown) provided in an engine (not shown) when the housing is attached to the engine block (not shown).

The main spring 40 is made of metal or the like and accommodated in the oil pressure chamber 11 such as to freely expand and contract as shown in FIG. 4. More specifically, one end of the spring abuts on the bottom part 32 of the housing 30, while the other end is arranged in contact with an outer circumferential surface of a retainer 53 of the check valve 50.

The main spring 40 biases the plunger 20 to the front side as shown in FIG. 4, as well as presses the check valve 50 (the retainer 53 and a seat member 51) against the stepped portion 21c to keep the check valve 50 fixed.

The check valve 50 is made up of the seat member 51, a valve member 52 that can make tight contact with an oil passage in the seat member 51, and the retainer 53 that guides the valve member 52, as shown in FIG. 4.

The check valve 50 may have any configuration as long as it allows the oil to flow into the oil pressure chamber 11 and prevents reverse flow of the oil into the oil reservoir chamber 12. A spring, for example, that biases the valve member 52 toward the seat member 51, may be set between the valve member 52 and the retainer 53.

These components of the check valve 50 are made of metal or synthetic resin and the like.

Figure 3:
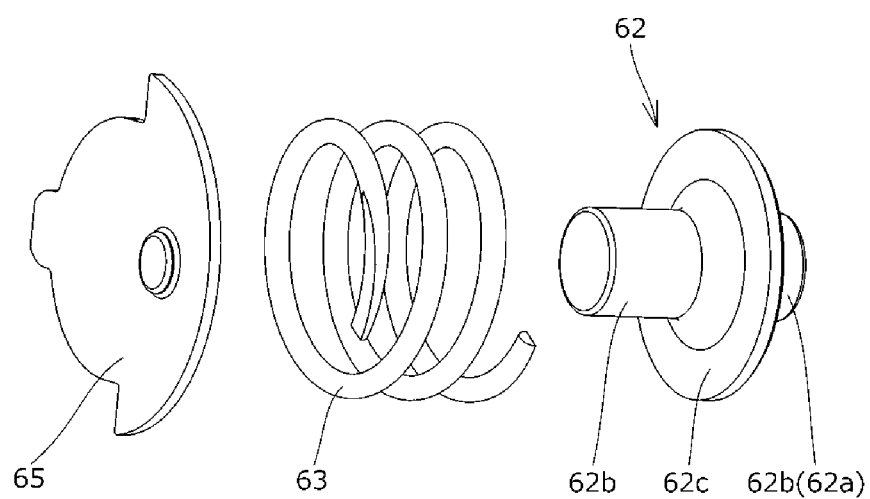
FIG. 3 is a perspective view illustrating a movable member, a pressure adjusting spring, and an attachment member that make up a pressure adjusting mechanism.

The pressure adjusting mechanism 60 adjusts the oil pressure in the oil pressure chamber 11, and includes, as shown in FIG. 3 or FIG. 4, a cylinder part 61 having a cylindrical inner circumferential surface 61a of a cylindrical shape, a movable member 62 having a piston part 62a set in the cylinder part 61 such as to be movable to and from the oil pressure chamber 11, a pressure adjusting spring (pressure adjusting biasing unit) 63 that biases the movable member 62 toward the oil pressure chamber 11, a movement restricting part 64 that restricts the movement of the movable member 62 toward the oil pressure chamber 11, and the attachment member 65 that is attached to the housing 30.

The cylinder part 61 is a section used for setting the movable member 62 (piston part 62a) therein such as to be slidable back and forth.

In this embodiment, as shown in FIG. 4, at least part of the inner wall of the adjustment space 36 (inner circumferential surface of the small-diameter hole 36a of the adjustment space 36) serves as the cylinder part 61.

The movable member 62 is made of metal such as aluminum or the like or synthetic resin or the like, and includes, as shown in FIG. 3 or FIG. 4, a columnar main body 62b, and a disk-like flange part 62c protruding radially outward from an outer circumferential surface of the main body 62b and having a larger diameter than the main body 62b.

Part of the main body 62b on one side of the flange part 62c facing the oil pressure chamber 11 serves as the piston part 62a set slidably in the cylinder part 61, while part of the main body 62b on the other side of the flange part 62c opposite from the oil pressure chamber 11 is set inside the pressure adjusting spring 63.

The pressure adjusting spring 63 is made of metal or the like and disposed, as shown in FIG. 4, such that one end abuts on the movable member 62 (flange part 62c) while the other end abuts on the attachment member 65.

The attachment member 65 is a plate-like member made of metal such as aluminum or the like or synthetic resin or the like, and attached to the housing 30 in a removable manner (or not in a removable manner) in order to stop the pressure adjusting spring 63 and movable member 62 from coming out from the opening of the adjustment space 36, as shown in FIG. 4.

The attachment member 65 is attached to the housing by being inserted from the insertion slit 35a formed to the housing 30.

A protruded portion of the attachment member 65 is fitted into the locking slit 35b.

The difference in diameter between the cylindrical outer circumferential surface of the piston part 62a and the cylindrical inner circumferential surface 61a of the cylinder part is so small to the extent that a liquid tight seal is maintained between the cylindrical inner circumferential surface 61a and the piston outer circumferential surface.

Therefore, between the position where the movable member 62 has moved closest to the oil pressure chamber 11 and the position farthest from the oil pressure chamber 11, a liquid tight seal is maintained between the piston outer circumferential surface and the cylindrical inner circumferential surface 61a, so that oil in the oil pressure chamber 11 is prevented from flowing through between the cylindrical inner circumferential surface 61a and the piston outer circumferential surface to the outside of the cylinder part 61, and further to the outside of the housing 30.

In this embodiment, the position where the movable member 62 has moved closest to the oil pressure chamber 11 is the position where the stepped portion 36c of the adjustment space 36 makes contact with the flange part 62c of the movable member 62. This way, the stepped portion 36c of the adjustment space 36 serves as the movement restricting part 64 that restricts the movement of the movable member 62 toward the oil pressure chamber 11 in this embodiment.

In this embodiment, the position where the movable member 62 is farthest from the oil pressure chamber 11 is determined by a relationship between the strength of the spring force of the pressure adjusting spring 63 and the oil pressure in the oil pressure chamber 11. Optionally, however, a second movement restricting part may be provided to the housing 30 or the attachment member 65, which abuts on the movable member 62 to restrict the movement of the movable member 62 toward the opposite side from the oil pressure chamber 11. When no such second movement restricting part is provided as in this embodiment, the pressure adjusting spring 63 may be designed to have a large diameter.

While there is a slight gap between the inner circumferential surface of the large-diameter hole 36b and the outer circumferential surface of the flange part 62c in this embodiment, this gap may be set such that a liquid tight seal is maintained between the inner circumferential surface of the large-diameter hole 36b and the outer circumferential surface of the flange part 62c.

In normal operation of the tensioner 10 of this embodiment configured as described above, the movable member 62 is biased by the pressure adjusting spring 63 toward the oil pressure chamber 11 as shown in FIG. 4 so that the movable member 62 (flange part 62*c*) is pressed against the movement restricting part 64 (stepped portion 36*c* of the adjustment space 36).

When the flange part 62*c* is pressed against the stepped portion 36*c*, the flange part 62*c* and the stepped portion 36*c* make tight contact with each other.

When the oil pressure in the oil pressure chamber 11 exceeds a certain level (when the built-up oil pressure inside the oil pressure chamber 11 exceeds the biasing force of the pressure adjusting spring 63), the movable member 62 is moved away from the oil pressure chamber 11 by the oil pressure in the oil pressure chamber 11. As the volume of the oil pressure chamber 11 increases in accordance with the moving amount of the movable member 62, the pressing force of the plunger 20 applied to the drive chain CH can be gradually reduced. Thus, the oil pressure in the oil pressure chamber 11 and the pressing force of the plunger 20 can be made stable with a simple structure.

As shown in FIG. 4, between the position where the movable member 62 has moved closest to the oil pressure chamber 11 (and stopped from moving further by the movement restricting part 64) and the position farthest from the oil pressure chamber 11, a liquid tight seal is maintained between the cylinder part 61 and the movable member 62. More specifically, a liquid tight seal is maintained between the cylindrical inner circumferential surface 61*a* and the piston outer circumferential surface of the piston part 62*a*.

While one embodiment of the present invention has been described above in detail, the present invention is not limited to this embodiment and may be carried out with various design changes without departing from the scope of the present invention set forth in the claims.

For example, while the tensioner 10 was described as a component to be incorporated in a timing system of a car engine in the embodiment above, the purpose of use of the tensioner 10 is not limited to this specific application.

Also, while the tensioner 10 was described as a component that applies tension to a drive chain CH with a tensioner lever G in the embodiment above, the plunger 20 can directly guide the drive chain CH slidably with a distal end thereof to apply tension to the drive chain CH.

The tensioner may not necessarily be applied to a transmission mechanism with a drive chain CH but can also be used for similar transmission mechanisms that use belts, ropes and the like, and can be applied in a variety of industrial fields where it is required to apply tension to an elongated component.

The term "liquid tight seal" herein is not limited to a state where a flow of oil is completely stopped, but includes a state where only a small amount of oil is allowed to flow.

While the tensioner 10 described in the embodiment above includes the oil reservoir chamber 12 as well as the oil pressure chamber 11 inside, the oil reservoir chamber 12 may be dispensed with. In this case, an oil supply passage that supplies oil from the outside of the housing 30 to the oil pressure chamber 11 may be provided, and a check valve may be provided between the oil supply passage and the oil pressure chamber 11, to allow the oil to flow from the oil supply passage side to the oil pressure chamber 11 while preventing the oil from flowing out from the oil pressure chamber 11 to the oil supply passage side.

In the embodiment described above, the pressure adjusting mechanism 60 has the movable member 62 slidably disposed in the cylinder part 61 formed in the housing 30 and is configured to maintain a liquid tight seal between the cylinder part 61 and the movable member 62 irrespective of the position of the movable member 62 (i.e., anywhere between the position where the movable member 62 has moved closest to the oil pressure chamber 11 and the position farthest from the oil pressure chamber 11). The pressure adjusting mechanism 60 is not limited to the specific form described above and may be configured in any other way as long as the movable member 62 is disposed inside the adjustment space 36 formed in the housing 30 such that at least part of the movable member 62 is movable to and from the oil pressure chamber 11 and a liquid tight seal is maintained between (at least part of) the movable member 62 and (at least part of) the inner wall of the adjustment space 36 irrespective of the position of the movable member 62. For example, at least part of the movable member 62 may be formed of an elastic material such as rubber or the like, and the movable member 62 may be set inside the adjustment space 36 such that at least part of the movable member 62 is movable to and from the oil pressure chamber 11.

In the embodiment described above, a liquid tight seal is maintained between the cylindrical inner circumferential surface 61*a* and the piston outer circumferential surface by setting a very small difference in diameter between the cylindrical inner circumferential surface 61*a* and the piston outer circumferential surface of the piston part 62*a*. The method of keeping a liquid tight seal is not limited to the one described above. For example, a sealing member such as a packing may be disposed between the cylindrical inner circumferential surface 61*a* and the piston outer circumferential surface to keep a liquid tight seal.

What is claimed is:

1. A tensioner comprising:
   a plunger having a plunger hole that is open on a rear side;
   a housing having a plunger bore that is open on a front side and accommodates the plunger;
   a main biasing unit that biases the plunger toward the front side; and
   a pressure adjusting mechanism that adjusts oil pressure in an oil pressure chamber formed between the plunger and the plunger bore,
   the pressure adjusting mechanism including an adjustment space formed in the housing, a movable member disposed in the adjustment space such as to be movable to and from the oil pressure chamber, and a pressure adjusting biasing unit that biases the movable member toward the oil pressure chamber,
   the pressure adjusting mechanism being configured such that a liquid tight seal is maintained between the movable member and an inner wall of the adjustment space, between a position where the movable member has moved closest to the oil pressure chamber and a position where the movable member is farthest from the oil pressure chamber.

2. The tensioner according to claim 1, wherein
   the housing includes a cylinder part formed as at least part of the inner wall of the adjustment space,
   the movable member includes a piston part disposed slidably in the cylinder part, and
   the liquid tight seal is maintained between the cylinder part and the piston part, between the position where the movable member has moved closest to the oil pressure chamber and the position where the movable member is farthest from the oil pressure chamber.

3. The tensioner according to claim 1, wherein the pressure adjusting mechanism includes a movement restricting part that restricts movement of the movable member toward the oil pressure chamber.

4. The tensioner according to claim 1, wherein
the adjustment space is formed to open to outside of the housing,
the pressure adjusting biasing unit is a pressure adjusting spring disposed inside the adjustment space,
the pressure adjusting mechanism includes an attachment member attached to the housing, and
the pressure adjusting spring is set such that one end thereof abuts on the movable member while the other end abuts on the attachment member.

* * * * *